United States Patent [19]
Hikita et al.

[11] Patent Number: 5,892,463
[45] Date of Patent: Apr. 6, 1999

[54] MOBILE NAVIGATION SYSTEM

[75] Inventors: Masayoshi Hikita; Toshio Sogawa, both of Tokyo, Japan

[73] Assignee: Mitsubishi Denki Kabushiki Kaisha, Tokyo, Japan

[21] Appl. No.: 812,713

[22] Filed: Mar. 6, 1997

[30] Foreign Application Priority Data

Sep. 5, 1996 [JP] Japan .................................. 8-235202

[51] Int. Cl.$^6$ .................................................. G08G 1/123
[52] U.S. Cl. ......................... 340/995; 340/905; 701/209
[58] Field of Search .................................. 340/905, 988, 340/990, 995; 364/449.2, 449.3, 449.4, 449.5; 701/208, 209, 210

[56] References Cited

U.S. PATENT DOCUMENTS

| | | | |
|---|---|---|---|
| 5,020,143 | 5/1991 | Duckeck et al. | 340/905 |
| 5,257,023 | 10/1993 | Furuya | 340/905 |
| 5,293,163 | 3/1994 | Kakihara et al. | 340/905 |
| 5,369,588 | 11/1994 | Hayami et al. | 340/990 |
| 5,406,490 | 4/1995 | Braegas | 340/905 |
| 5,506,774 | 4/1996 | Nobe et al. | 340/995 |
| 5,521,826 | 5/1996 | Matsumoto | 340/990 |

FOREIGN PATENT DOCUMENTS 6-180796   6/1994   Japan .

*Primary Examiner*—Brent A. Swarthout
*Attorney, Agent, or Firm*—Sughrue, Mion, Zinn, Macpeak & Seas, PLLC

[57] ABSTRACT

In a mobile navigation system, it is possible to judge as to whether or not either a traffic jam region or a traffic restriction region is reduced until a moving object reaches this traffic jam region, or traffic restriction region. The mobile navigation system comprises present position detecting means, map information storage means, route searching means, and traffic information receiving means. Further, the navigation system comprises specific region judging means for judging as to whether or not a traffic jam or restriction region is present within the route searched by the route searching means; arrival time calculating means for calculating time required such that the moving object reaches the traffic jam or restriction region; decreasing time detecting means for detecting time during which the traffic jam or restriction region is decreased based upon the traffic jam or restriction information received by the traffic information receiving means; and re-searching control means for causing the route searching means to re-search the route in accordance with a relationship between the output from the decreasing time detecting means and the output from the arrival time calculating means when the specific region judging means judges that the traffic jam or restriction region is present.

10 Claims, 17 Drawing Sheets

MOBILE NAVIGATION SYSTEM

BACKGROUND OF THE INVENTION

The present invention relates to a navigation system mounted on a mobile, e.g., an automobile and a vehicle. More specifically, the present invention is directed to a mobile navigation system capable of judging an end of a traffic jam until an automobile approaches such place.

A mobile navigation system is widely utilized in the field. For instance, one conventional mobile navigation system is described in Japanese Unexamined Patent Publication 6-180796, the schematic system diagram of which is shown in FIG. 1. In this drawing, reference numeral 1 indicates the map data storage unit for storing the map data, reference numeral 2 represents the GPS (Global Positioning System) receiver unit arranged by the GPS system, for detecting a present position of a vehicle (not shown in detail), and reference numeral 3 shows the traffic information receiving unit for receiving the transmitted traffic information.

Also, reference numeral 4 indicates the navigation unit for calculating the present position of the vehicle based upon the signal outputted from the GPS receiver unit 2, and for entering therein this present position information and the map data stored in the map data storage unit 1 to thereby search a route from this present position to a target (destination) position. Reference numeral 5 shows the system control unit for controlling an information display by the display unit 6 in response to the outputs derived from the navigation unit 4 and the traffic information receiving unit 3. The display unit 6 is constructed of the LCD (liquid crystal display). Reference numeral 7 is the voice unit for producing alarm sound.

Subsequently, the operations of this conventional mobile navigation system will now be explained.

First, the navigation unit 4 searches the optimum route defined from the present position up to the destination place, and the road information receiving unit 3 receives the traffic jam information.

Then, the system control unit 5 judges as to whether or not a region indicative of the above-described traffic jam information is contained in the route. If the system control unit 5 judges that the region indicative of the traffic jam is not contained in the route, then this route is displayed on the display unit 6. Conversely, if the system control unit 5 judges that the traffic-jam region is contained in the route, then the navigation unit 4 is brought into the standby state in order to re-search the route, and furthermore the voice unit 7 is actuated, so that the operator is requested to judge as to whether or not the route is again searched.

As described above, since the conventional mobile navigation system is so arranged, this navigation system never considers such a case that the traffic jam will be solved until the moving object reaches this traffic jam region. As a consequence, there is a problem that the operator must judge as to whether or not the route is required to be again searched under the following initial condition. That is, the traffic jam region is still present in the route even in the above-explained case.

SUMMARY OF THE INVENTION

The present invention has been made to solve the above-described problem, and therefore, has an object to provide a mobile navigation system capable of judging as to whether or not either a traffic jam region or a traffic restriction region is reduced until a moving object reaches such a traffic jam or restriction region involved in a route defined up to a destination place.

According to the present invention, a mobile navigation system comprises present position detecting means for detecting a present position of a moving object, map information storage means for storing map information, route searching means for searching a route defined from said present position of said moving object detected by said present position detecting means up to a destination place from said map information of said map information storage means, traffic information receiving means for receiving traffic jam information or traffic restriction information, specific region judging means for judging whether or not a traffic jam or restriction region is present within said route searched by said route searching means, degree detection means for detecting a degree of said traffic jam or restriction based upon said traffic jam or restriction information received by said traffic information receiving means, and re-searching control means for causing said route searching means to search again a route in accordance with a detection result of said degree detection means.

Furthermore, according to the invention, a mobile navigation system comprises present position detecting means for detecting a present position of a moving object, map information storage means for storing map information, route searching means for searching a route defined from the present position of the moving object detected by said present position detecting means up to a destination place from the map information of said map information storage means, traffic information receiving means for receiving traffic jam information or traffic restriction information, specific region judging means for judging as to whether or not a traffic jam or restriction region is present within the route searched by said route searching means, degree detection means for detecting a degree of said traffic jam or restriction based upon said traffic jam or restriction information received by said traffic information receiving means, and detour route detecting means for detecting a detour route which contains neither a traffic jam region nor a traffic restriction region from the map information of said map information storage means in accordance with the judgment of said specific region judging means, travel time calculating means for calculating travel time required for the route searched by said route searching means in that a traffic jam or restriction region is contained, and also for calculating travel time required for the detour route detected by said detour route detecting means in that no traffic jam or restriction region is contained, based upon a relationship among the output from said specific region judging means, the output from said degree detecting means, and the output from said detour route detecting means; and route display control means for controlling a display unit to display thereon one of said route searched by said route searching means and said detour route based on a relationship between the travel time of said route and the travel time of said detour route, calculated by said travel time calculating means.

DETAILED DESCRIPTION OF THE PREFERRED EMBODIMENTS

First Embodiment

Figure 1:
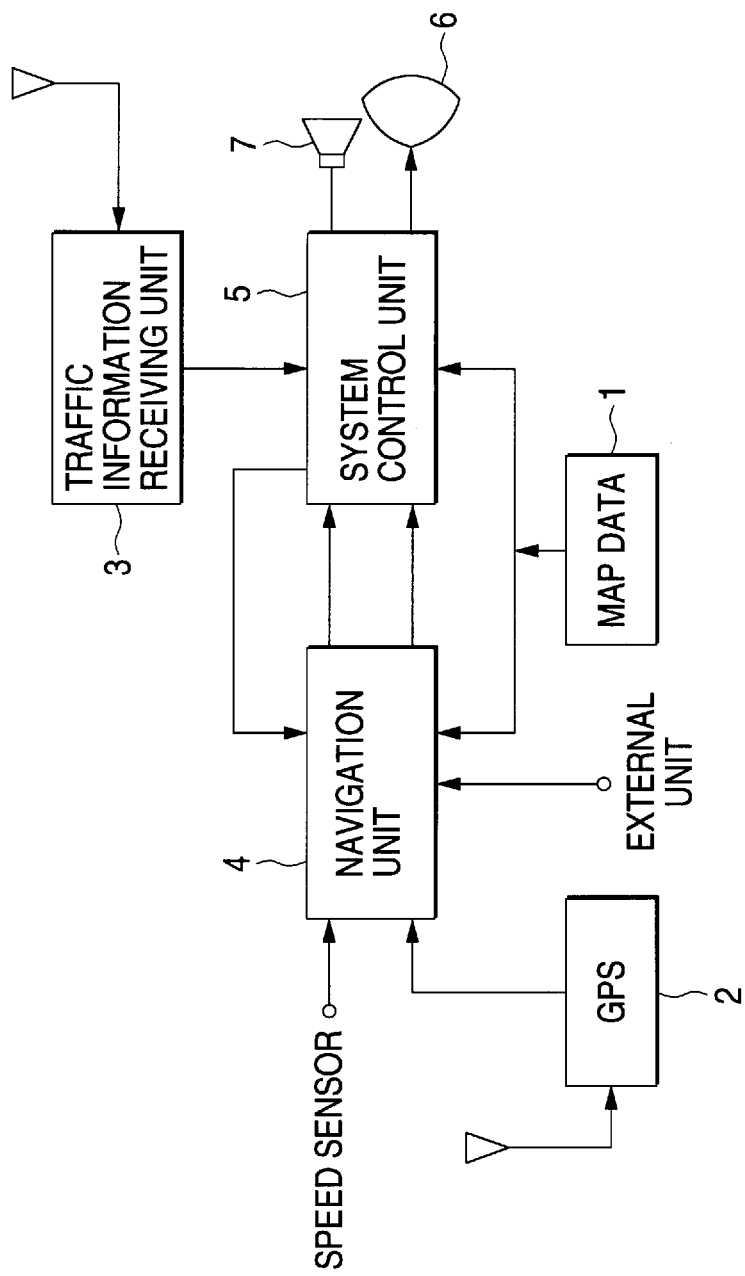
FIG. 1 is a schematic block diagram for showing the entire management of the conventional mobile navigation system.
Figure 2:
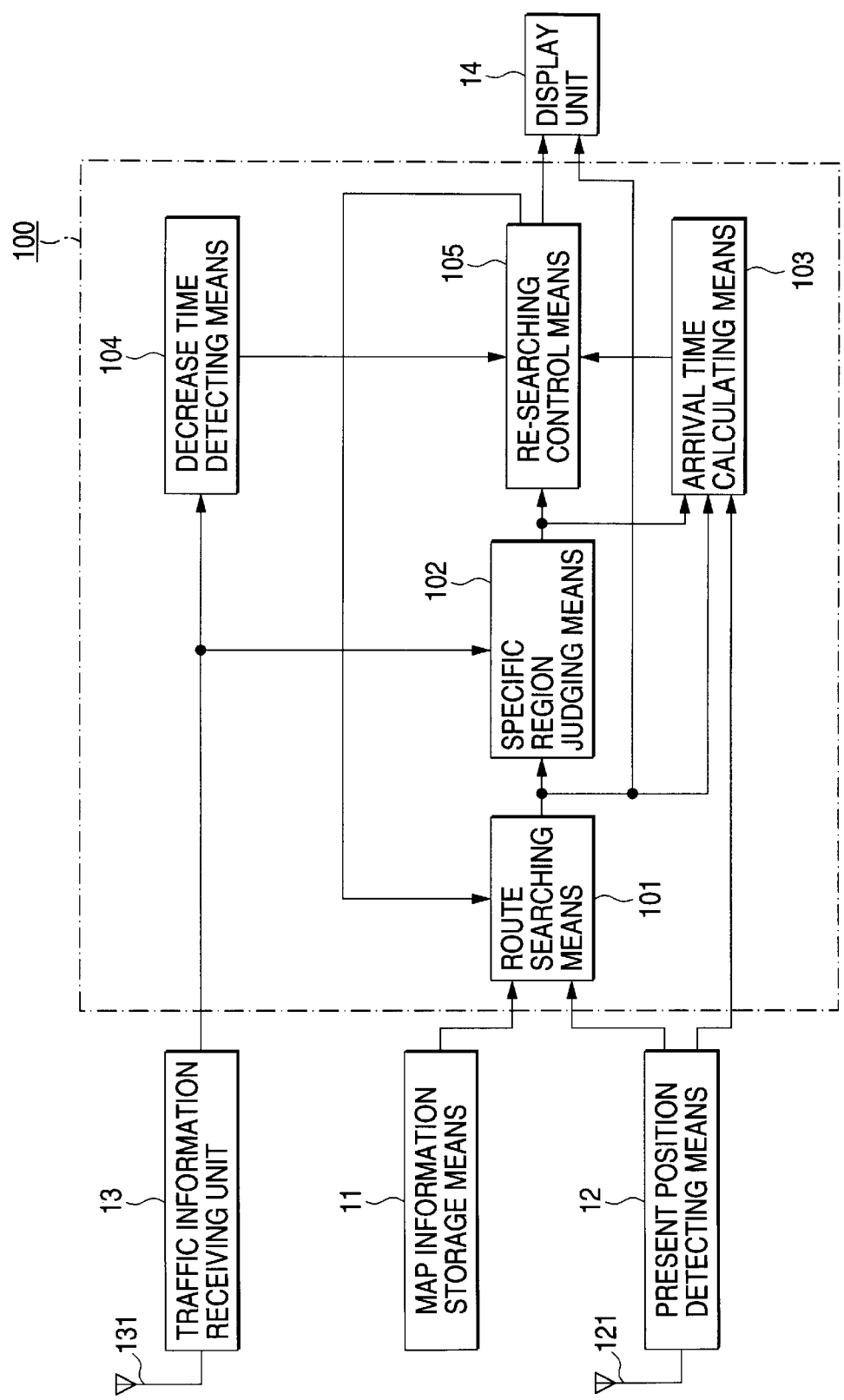
FIG. 2 is a schematic block diagram for representing an entire arrangement of a mobile navigation system according to a first embodiment of the present invention.

FIG. 2 is a schematic block diagram for representing an overall arrangement of a mobile navigation system according to a first preferred embodiment of the present invention.

In this first mobile navigation system of FIG. 2, reference numeral 11 shows map information storage means constructed of a CD-ROM, an IC card and the like, for storing map information containing detailed road information, and reference numeral 12 represents present position detecting means for detecting a present position of a mobile (moving) object such as an automobile (vehicle) by way of an earth magnetism sensor (not shown) and the GPS (Global Positioning System) with using a plurality of satellites. Also, reference numeral 13 denotes traffic information receiving means (for instance, VICS (Vehicle Information and Communication System) receiver) for receiving traffic jam (congestion) information or traffic restriction information transmitted from an information transmitting apparatus (beacon) installed along with the road such as on an electric light pole, or a telephone pole, and reference numeral 14 is a display unit for displaying various information. The information transmitting apparatus is used to communicate between a vehicle and a road, a so-called "road-to-vehicle communication".

Further, reference numeral 121 denotes a GPS signal receiving antenna, and reference numeral 131 shows a traffic information receiving antenna.

It should be noted that a speed sensor (not shown in detail) is also provided with the above-described present position detecting means 12, and this speed sensor is mounted on, for example, a wheel of a moving object so as to detect a speed based upon rotation pulses-of this wheel.

Now, either the traffic jam information or the traffic restriction information will be explained with reference to FIG. 3.

Figure 3:
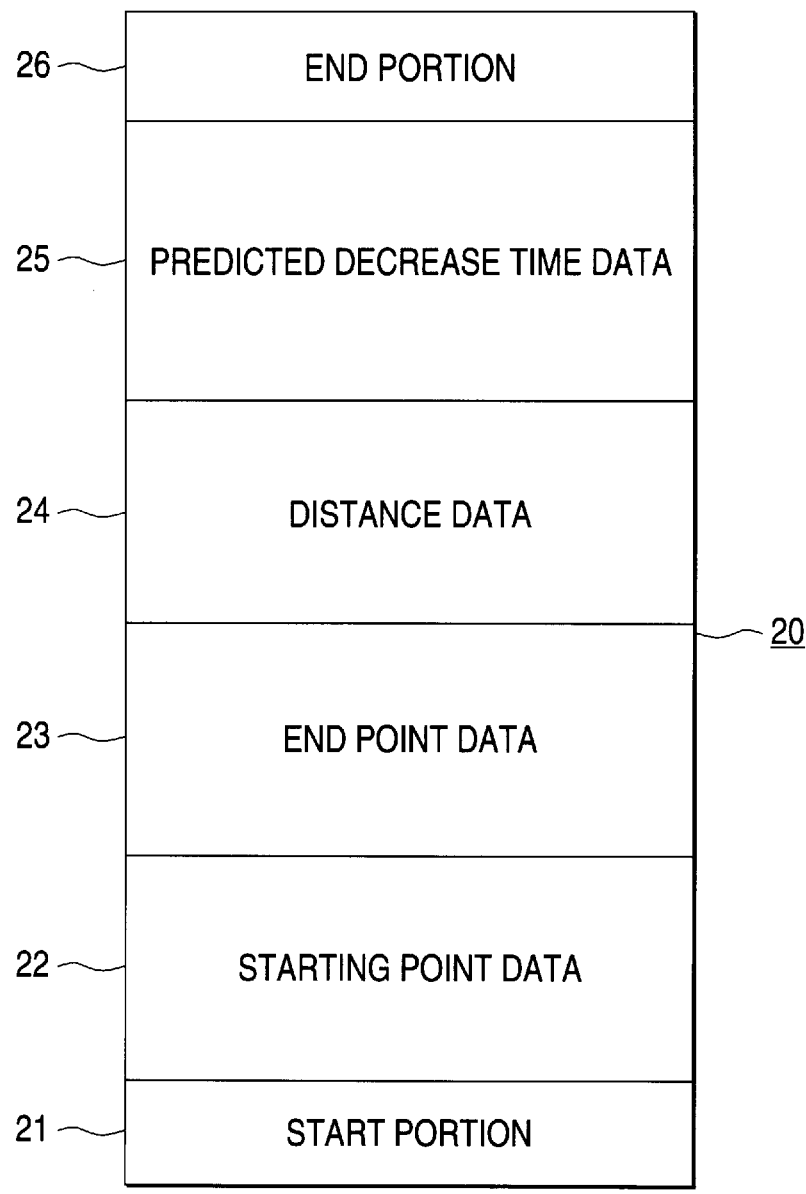
FIG. 3 schematically illustrates traffic jam information or traffic restriction information received by the traffic information receiving means employed in the mobile navigation system shown in FIG. 2.

FIG. 3 schematically represents one structural sample of data received by the traffic information receiving means 13. In FIG. 3, reference numeral 21 is a starting portion indicative of the beginning of one section of the traffic jam or traffic restriction information, and reference numeral 22 is a starting point data portion representative of a starting position of one section of either the traffic jam or the traffic restriction. Also, reference numeral 24 is a distance data portion for indicating a traffic jam distance, or a traffic restriction distance within a section defined from the starting position indicated by the starting point data portion 22 to the end position indicated by the end point data portion 23. Reference numeral 25 is a predicted decreasing time data portion indicative of either predicted traffic jam decreasing time or predicted traffic restriction decreasing time, and further reference numeral 26 is an end portion for showing an end of one section of either the traffic jam or traffic restriction information.

Either the traffic jam information or the traffic restriction information received by the traffic information receiving means 13 indicates information 20 of one section by reference numerals 21 to 26.

Referring back to FIG. 2, reference numeral 101 denotes route searching means for searching a route from a moving object (not shown) detected by the present position detecting means 12 up to a destination place from the map information stored in the map information storage means 11, and reference numeral 102 shows specific region judging means for judging whether or not a traffic jam region or a traffic restriction region is present based upon the traffic jam information or the traffic restriction information received by the traffic information receiving means 13 within the route searched by the route searching means 101. Also, reference numeral 103 is arrival time calculating means for calculating time during which the moving object reaches either the traffic jam region or the traffic restriction region based upon the traffic jam or restriction information received by the traffic information receiving means 13, the speed information detected by the speed sensor, and the present position detected by the present position detecting means 12.

Furthermore, in FIG. 2, reference numeral 104 shows decreasing time detecting means for detecting time during which either the traffic jam region or the traffic restriction region is decreased based on the traffic jam information or the traffic restriction information received by the traffic information receiving means 13. Reference numeral 105 represents re-searching control means for causing the route searching means 101 to be again operated in accordance with a relationship between the output from the arrival time calculating means 103 and the output from the decreasing time detecting means 104 when the specific region judging means 102 judges that either the traffic jam region or the traffic restriction region is present.

It should be understood that a control unit 100 is arranged by the above-described route searching means 101, specific region judging means 102, arrival time calculating means 103, decreasing time detecting means 104, and re-searching control means 105.

Operations of the first mobile navigation system shown in FIG. 2 will now be described with reference to a flow chart of FIG. 4.

First, a route searching operation is commenced (step 300), the present position detecting means 12 detects the present position (step 301), and an operator sets a destination place by manipulating an operation unit (not shown)(step 302).

Then, based upon the present position detected at the step 301 and the position of the destination place set at the step 302, the route searching means 101 searches the route (step 303). After this route searching operation defined at the step 303, the traffic information receiving means 13 receives either the traffic jam information or the traffic restriction information (step 304).

Next, after the process operation defined at the step 304, the specific region judging means 102 judges as to whether or not either the traffic jam region or the traffic restriction region is present based upon the traffic information received at the step 304 within the route searched at the step 303 (step 305). When it is judged at this step 305 that the traffic jam or restriction region is present in this route, the process operation is advanced to a step 306.

At this step 306, the decreasing time detecting means 104 detects the decreasing time of either the traffic jam region or the traffic restriction region from the predicted decreasing time data unit 25 shown in FIG. 3 received from the traffic information receiving means 13, and then outputs this detected decreasing time to the re-searching control means 105. Then, after the process operation defined at the step 306, the arrival time calculating means 103 calculates the time required when the moving object reaches either the traffic jam region or the traffic restriction region, and then outputs this calculation result to the re-searching control means 105 (step 307).

Next, the re-searching control means 105 compares the decreasing time outputted at the step 306 with the arrival time outputted at the step 307, and then judges that either this traffic jam region or traffic restriction region is not decreased until the moving object has reached the traffic jam region or the traffic restriction region. Thus, the process operation is advanced to a step 309 (step 308).

Furthermore, at this step 309, the re-searching control means 105 again activates the route searching means 101 to search the route. After this process operation defined at this step 309, the process operation is advanced to a step 310, at which the route is displayed on the display unit 14. After the process operation of this step 310 is carried out, the process operation is returned to the previous step 301.

To the contrary, when the specific region judging means 102 judges that the traffic jam region or the traffic restriction region is not present at the step 305, and when the re-searching control means 105 judges that the decreasing time is shorter than the arrival time at the step 308, the process operation is advanced to a further step 310. At this step 310, a route is displayed on the display unit 14, and then the process operation is returned to the previous step 301.

As a result, in accordance with the mobile navigation system of the above-described arrangement, in such a case that either the traffic jam region or the traffic restriction region is present within the searched route, it is possible to judge as to whether or not the route is again searched based on the relation ship between the arrival time during which the moving object reaches the traffic jam or traffic restriction region, and the decreasing time during which this traffic jam or traffic restriction region is decreased. Accordingly, it is possible to avoid waste time consumption caused by either the traffic jam or the traffic restriction, so that the travel time of the moving object can be extremely reduced.

As apparent from the foregoing description, when it is judged at the step 308 that the decreasing time is longer than the arrival time, the process operation is advanced to the step 308 where the route is again searched. Alternatively, the process operation may be again returned to the step 301, so that a series of the above-described process operation may be again carried out.

Second Embodiment

Figure 5:
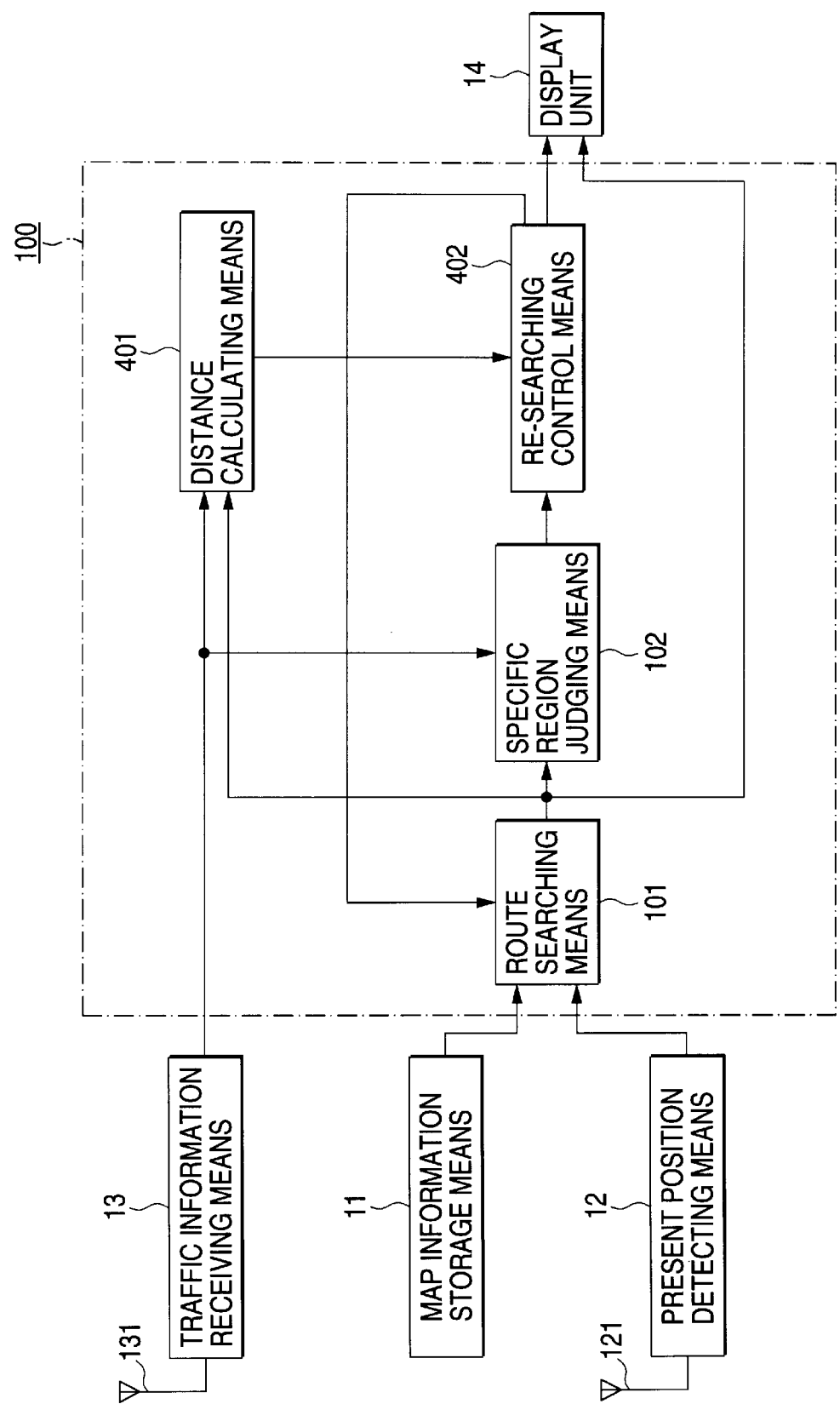
FIG. 5 is a schematic block diagram for indicating an overall arrangement of a mobile navigation system according to a second embodiment of the present invention.
Figure 6:
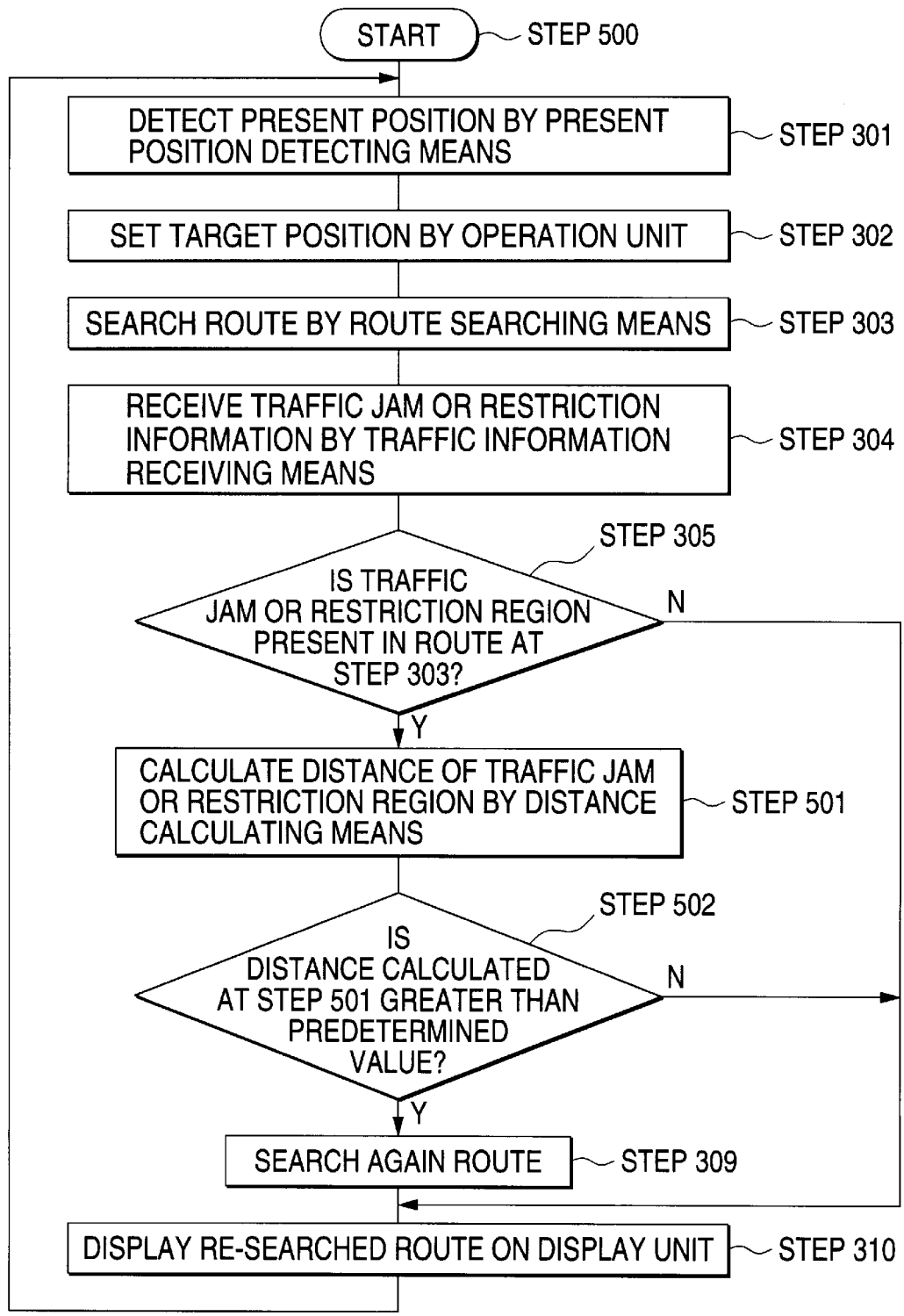
FIG. 6 is a flow chart for describing operations of the mobile navigation system shown in FIG. 5.

FIG. 5 is a schematic block diagram for showing an arrangement of a mobile navigation system with employment of a distance calculating means, according to a second preferred embodiment of the present invention. FIG. 6 is a flow chart for representing operations of the second mobile navigation system shown in FIG. 5. It should be noted that the same reference numerals of the above-described embodiment 1 will be employed as those for denoting the same or similar units in the second embodiment of FIG. 5.

In FIG. 5, reference numeral 401 shows a distance calculating means for calculating a distance of either a traffic jam region or a traffic restriction region contained in a route searched by the route searching means 101 based on this searched route and the traffic jam or restriction information received by the traffic information receiving means 13. Reference numeral 402 denotes a re-searching control means for causing the route searching means 101 to re-search the route in response to the output from the distance calculating means 301 when the specific region judging means 102 judges that either a traffic jam region or a traffic restriction region is present.

Referring now to the flow chart of FIG. 6, operations of the mobile navigation system shown in FIG. 5 will be explained.

First, the navigation operation is initiated (step 500), and then the process operation is advanced to a step 301.

When it is judged at the step 305 that either the traffic jam region or the traffic restriction region is present in the route, the process operation is advanced to a step 501. At this step 501, the distance calculating means 401 calculates a distance of either the traffic jam region or the traffic restriction region present in the route searched at the step 303 (step 501).

Then, a judgment is made as to whether or not the distance calculated at the step 501 is longer than, or equal to a predetermined value (for instance, longer than, or equal to 1 km) at a step 502. When it is judged at this step 502 that this distance is longer than, or equal to a preselected value, the route is re-searched (step 309). After the process operation defined at the step 309, the process operation is advanced to a step 310, at which the route is displayed on the display unit 14, and then the process operation is returned to the step 301.

In such a case that neither the traffic jam region, nor traffic restriction region is present at the step 305, and further it is judged at the step 502 that the distance is shorter than a predetermined value, the process operation is advanced to a step 310.

As a consequence, since the second mobile navigation system is constructed by employing the above-explained circuit arrangements, when either the traffic jam region or the traffic restriction region is present in the searched route, such a judgment is established as to whether or not the route is again searched in accordance with the distance of this traffic jam, or restriction region. In such a case that the distance of either the traffic jam region or the traffic restriction region is shorter than a predetermined value, it is so judged that the route other than the region containing neither the traffic jam region or the traffic restriction region would require longer moving (travel) time than the travel time of the route containing either the traffic jam region or the traffic restriction region. Accordingly, it is possible to select the route containing either the traffic jam region or the traffic restriction region.

In the above case, when it is judged at the step 502 that the calculated distance is longer than, or equal to a preselected value, the process operation is advanced to the step 309 at which the route is again searched. Alternatively, the process operation may be returned to the step 301, at which a series of the process operation is again processed.

Third Embodiment

FIG. 6 is a schematic block diagram for showing an arrangement of a mobile navigation system with a decreasing rate calculating means, according to a third preferred embodiment of the present invention. FIG. 8 is a flow chart for representing operations of the mobile navigation system shown in FIG. 7. It should be noted that the same reference numerals of the above-described embodiments 1 and 2 will be employed as those for denoting the same or similar units in the third embodiment.

Figure 7:
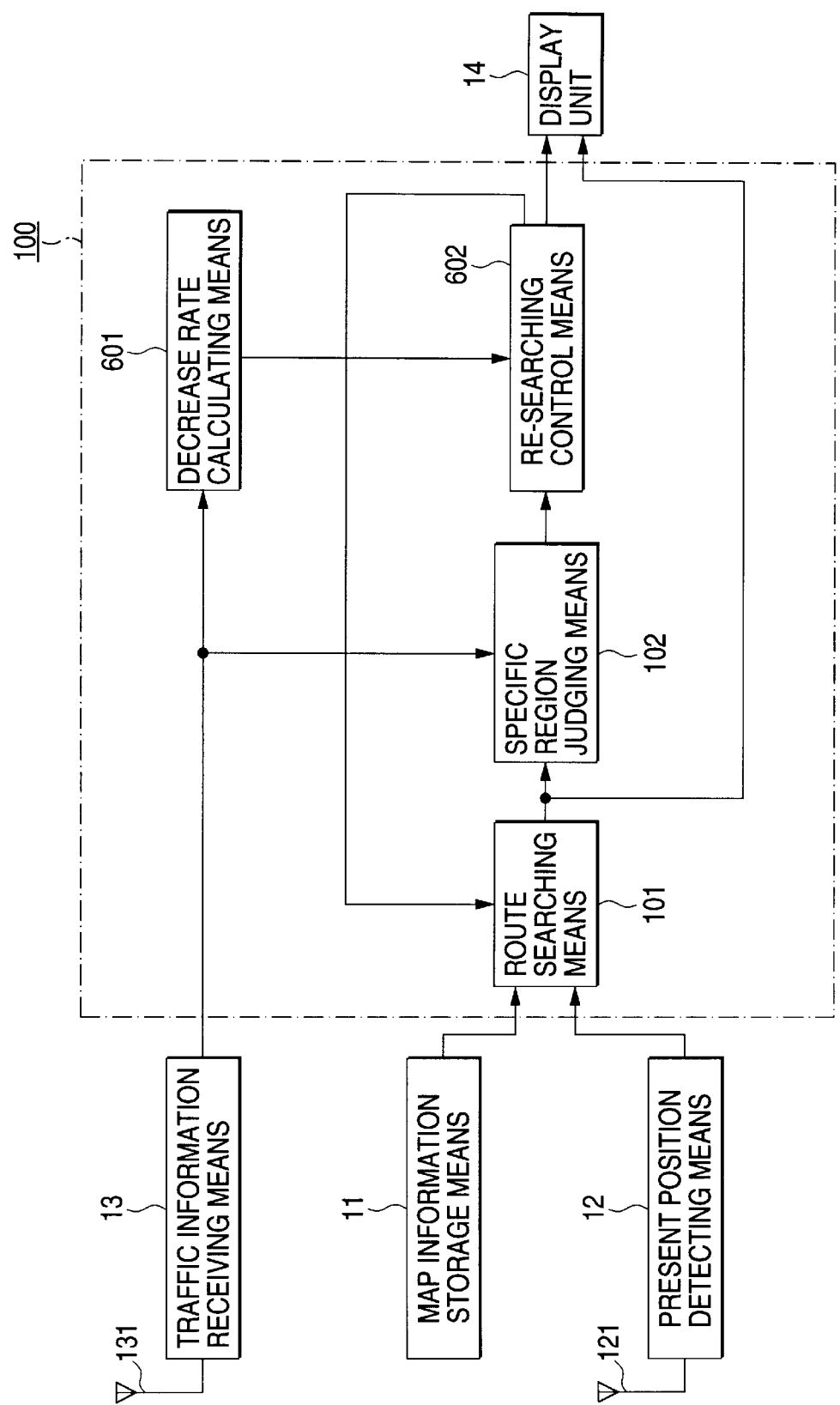
FIG. 7 is a schematic block diagram for indicating an overall arrangement of a mobile navigation system according to a third embodiment of the present invention.
Figure 8:
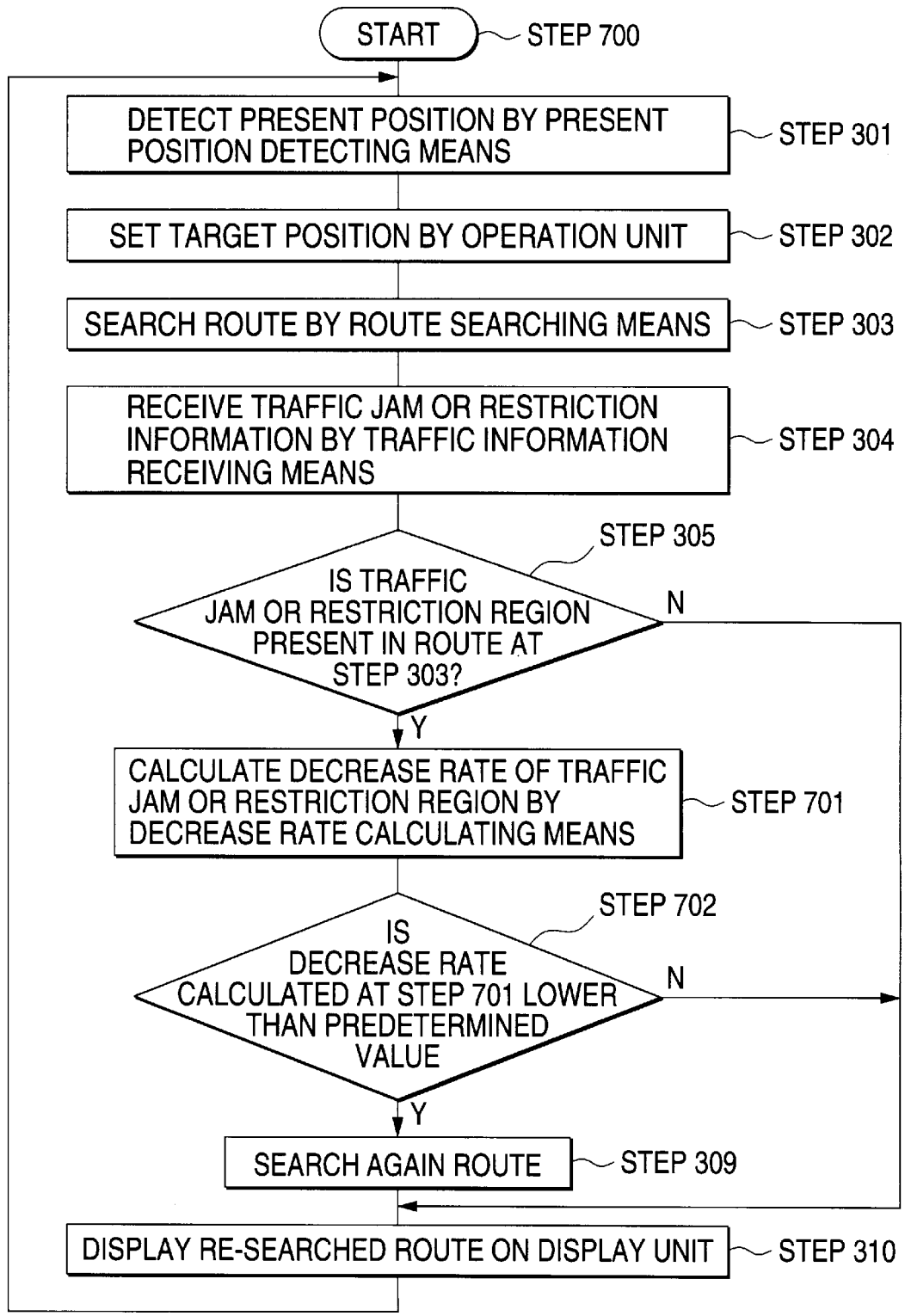
FIG. 8 is a flow chart for describing operations of the mobile navigation system shown in FIG. 7.

In FIG. 7, reference numeral 601 shows a decreasing rate calculating means for calculating a rate at which either a traffic jam region or a traffic restriction region is decreased based upon either traffic jam information or traffic restriction information received by the traffic information receiving means 13. Also, reference numeral 602 denotes a re-searching control means for causing the route searching means 101 to re-search the route in accordance with a relationship between the output from the decreasing rate calculating means 601 and the output from the arrival time calculating means 103 when the specific region judging means 102 judges that either the traffic jam region or the traffic restriction region is present.

Referring now to the flow chart of FIG. 8, operations of the third mobile navigation system shown in FIG. 7 will be explained.

First, the navigation operation is initiated (step 700), and then the process operation is advanced to a step 301.

Figure 4:
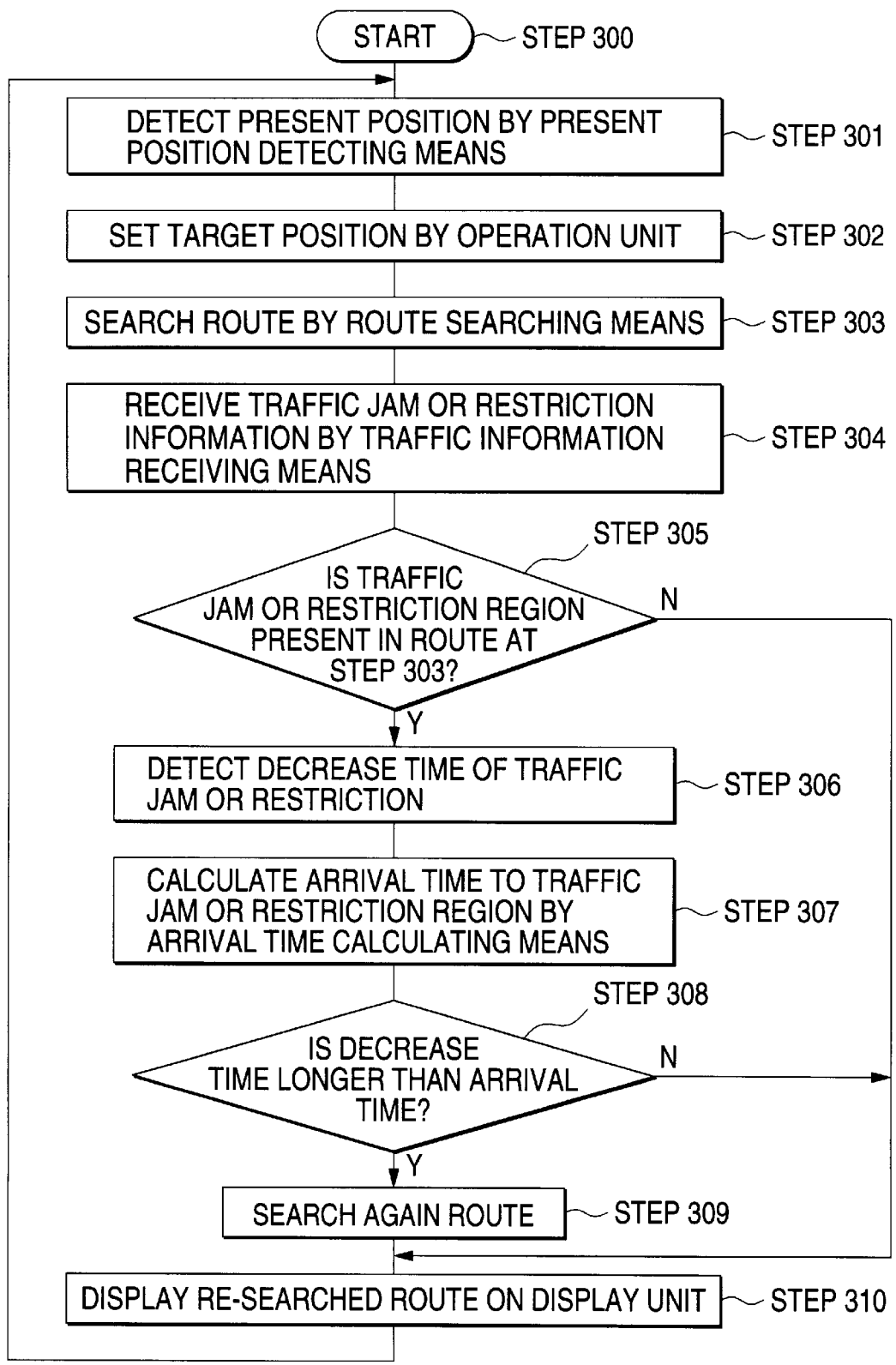
FIG. 4 is a flow chart for describing operations of the mobile navigation system shown in FIG. 2.

It should be noted that since the operations defined from the step 301 to the step 305 are similar to those of FIG. 4, explanations thereof are omitted.

When it is judged at the step 305 that either the traffic jam region or the traffic restriction region is present, the process operation is advanced to a step 701. At this step 701, the decreasing rate calculating means 601 calculates a rate at which either the traffic jam region or the traffic restriction region is decreased based upon either the traffic jam information or the traffic restriction information received from the traffic information receiving means 13.

Now, a description will be made of the decreasing rate calculation method of this decreasing rate calculating means 601 with reference to FIG. 9.

Figure 9:
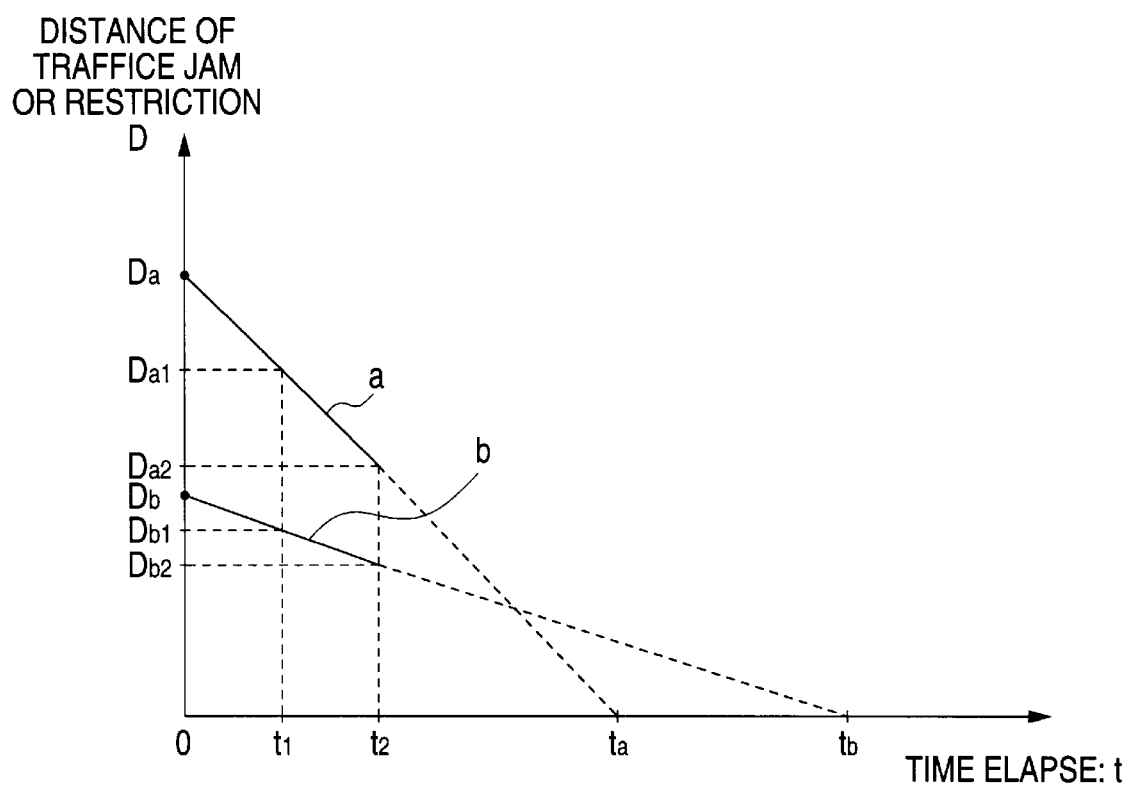
FIG. 9 is a relationship diagram for representing time and a traffic jam distance (or a traffic restriction distance) received by the traffic information receiving means of the mobile navigation system shown in FIG. 7.

That is, FIG. 9 shows a relationship between time and either a traffic jam distance or a traffic restriction distance. In FIG. 9, symbol "a" shows such a condition that either the traffic jam distance or the traffic restriction distance will disappear after 10 minutes elapse, symbol "b" represents such a condition that either the traffic jam distance or the traffic restriction distance will disappear after 20 minutes elapse, and symbols "t" and "$t_2$" denote preselected time (for instance, after 2 minutes, 4 minutes).

Assuming now that the present time is equal to "0", the decreasing rate calculating means 601 detects either a traffic jam distance or a traffic restriction distance $D_0$ at this time. Subsequently, the decreasing rate calculating means 601 detects either a traffic jam distance or a traffic restriction distance $D_1$ after $t_1$ minutes have passed. Furthermore, the decreasing rate calculating means 601 detects either a traffic jam distance or a traffic restriction distance $D_2$ after $t_2$ minutes have passed.

Based on the below-mentioned equation (1), the decreasing rate "a" is calculated:

$$\frac{D_1 - D_2}{t_1 - 0} \quad \frac{D_2 - D_1}{t_2 - t_1} \, a \tag{1}$$

where $t_1 \neq 0$, $t_2 \neq 0$, and $t_1 \neq t_2$.

It is understandable that the smaller, the decreasing rate "a" calculated by this equation (1) becomes, the higher the decreasing rate becomes.

As described above, the decreasing rate "a" is calculated, and then the process operation is advanced to a step 702.

At this step 702, the re-searching control means 602 judges as to whether or not the decreasing rate calculated at the previous step 701 is greater than, or equal to a predetermined value. When it is judged that the decreasing rate a is greater than the predetermined value, the re-searching control means 602 again searches the route (step 309). After the process operation defined at this step 309, the process operation is advanced to a step 310 at which the route is displayed on the display unit 14. Then, the process operation is advanced to the step 301.

To the contrary, when it is judged that neither the traffic jam region nor the traffic restriction region is present at the step 305, and when it is judged at the step 702 that the decreasing rate is less than the predetermined value, the process operation is advanced to a step 310 at which the route is displayed on the display unit 14. Then, the process operation is returned to the step 301.

Accordingly, in the mobile navigation system of the above-described arrangement, in such a case that either the traffic jam region or the traffic restriction region is present in the searched route, the decreasing rate of this traffic jam, or restriction region is calculated. Then, the mobile navigation system may judge as to whether or not the route is again searched, depending upon such a condition whether or not the calculated decreasing rate is larger than, or equal to a predetermined value. As a consequence, the optimum route can be selected by merely checking whether or not the decreasing rate "a" is greater than, or equal to a predetermined value, so that the travel time of the moving object can be reduced.

It should be noted that when it is judged at the step 702 that the decreasing rate is longer than, or equal to the predetermined value, the process operation is advanced to the step 309 at which the route is re-searched. Alternatively, the process operation may be returned to the step 301, so that a series of the process operations may be again carried out.

Fourth Embodiment

As previously explained in the first embodiment, the decreasing time of the traffic jam region or the traffic restriction region is detected from the predicted decreasing time data unit 25. In a mobile navigation system according to a fourth embodiment, the predicted decreasing time may be calculated as follows: with employment of the decreasing rate "a" (for instance a=−1) calculated in the embodiment 3, and also at least one pair of time information: x and traffic jam or restriction distance information: y (for example, x, y=t2, Da2), a value of "b" is firstly calculated based on the following equation (2). Subsequently, predicted decreasing time: T equal to a value of "x" when y=0 is calculated by using the below-mentioned equation (3). As a result, this predicted decreasing time T may be employed as the function of the predicted decreasing time unit 25.

$$y=ax+b \quad (2)$$

$$T=-b/a \quad (3)$$

Fifth Embodiment

Figure 10:
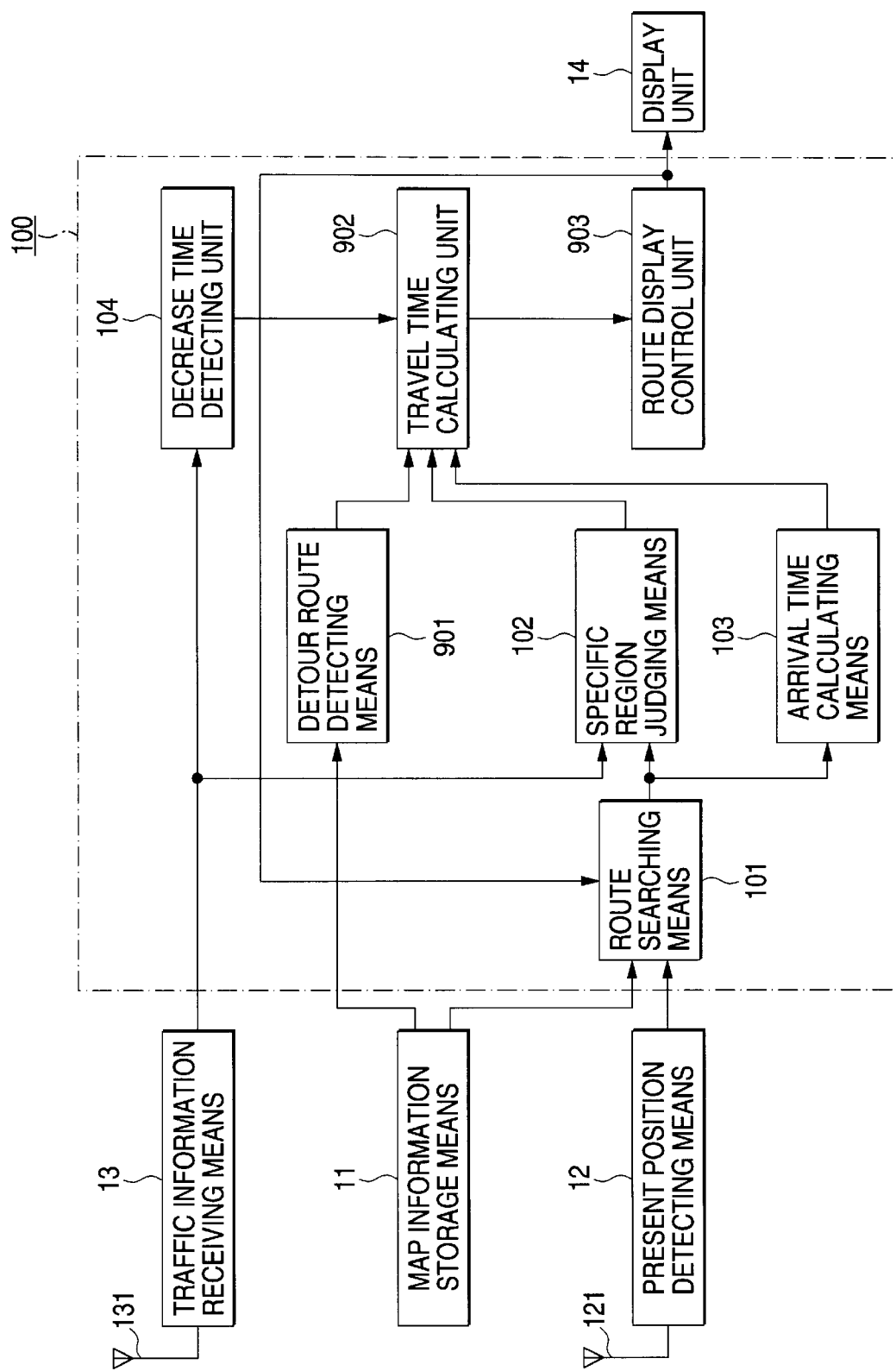
FIG. 10 is a schematic block diagram for indicating an overall arrangement of a mobile navigation system according to a fifth embodiment of the present invention.
Figure 11:
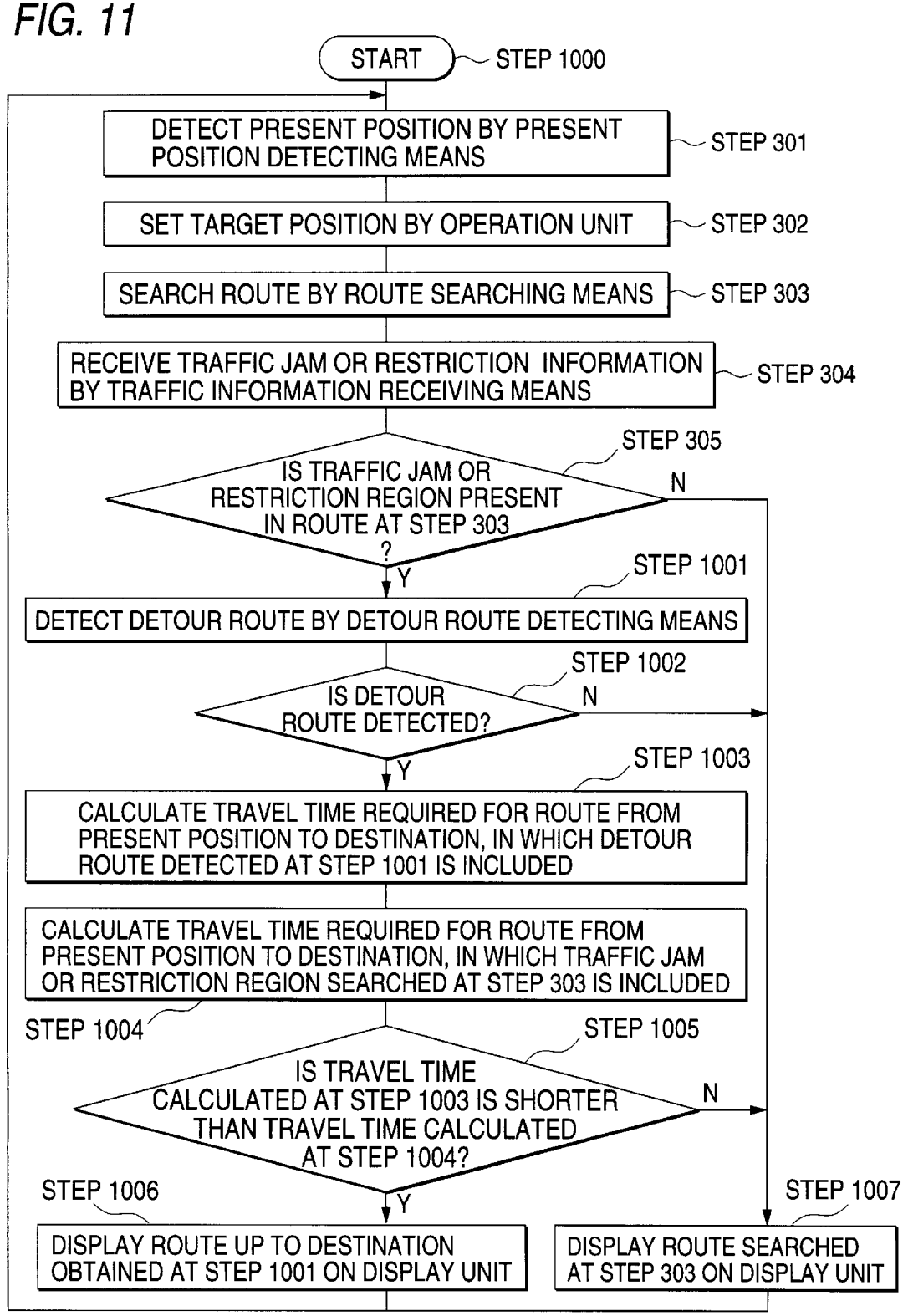
FIG. 11 is a flow chart for describing operations of the mobile navigation system shown in FIG. 10.

FIG. 10 is a schematic block diagram for showing an arrangement of a mobile navigation system, in which travel time required for a route containing either a traffic jam or restriction region is compared with travel time required for a route containing neither a traffic jam nor restriction region, and the route for the shorter travel time is displayed on a display unit, according to a fifth preferred embodiment of the present invention. FIG. 11 is a flow chart for representing operations of the mobile navigation system shown in FIG. 10. It should be noted that the same reference numerals of the above-described embodiments 1 to 3 will be employed as those for denoting the same or similar units in the fifth embodiment of FIG. 10.

In FIG. 10, reference numeral 901 indicates a detour route detecting means for detecting a detour route which does not contain a traffic jam or restriction region from map information of the map information storage means 11 based upon the judgment result of the specific region judging means 102. Reference numeral 902 shows a travel time calculating means for calculating travel time of a first route and travel time of a second route in accordance with a relationship among the output from the specific region judging means, the output from the decreasing time detecting means, the output from the arrival time calculating means, and the output from the detour route detecting means. The first route is defined from a present position up to a destination place in which the traffic jam or restriction region is contained, whereas the second route is defined from a present position up to a target place in which the detour route detected by the detour route detecting means is contained. Reference numeral 903 indicates a route display control means for selecting displaying one of the above-described first and second routes based on the relationship between the travel time of the first route and the travel time of the second route, which have been calculated by this travel time calculating means 902.

Referring now to the flow chart of FIG. 11, operations of the mobile navigation system of the fifth embodiment shown in FIG. 10 will be explained.

First, the route searching operation is initiated (step 1000), and then the process operation is advanced to a step 301. It should be understood that since the process operations defined from the step 301 to the step 305 are similar to those of FIG. 4, explanations thereof are omitted.

When it is judged at the step 305 that the traffic jam or restriction region is present, the process operation is advanced to a step 1001. At this step 1001, the detour route detecting means 901 detects the detour route out of traffic jam or restriction region from the map information storage means 11. Then, the travel time calculating means 902 judges as to whether or not the detour route is detected at the step 1001 (step 1002).

When it is judged at the step 1002 that the detour route is found, the travel time calculating means 902 calculates the second travel time required for the second route defined from the present position up to the destination place, involving the detour route detected at the step 1001 (step 1003).

After the process operation defined at this step 1003, the travel time calculating means 902 calculates the first travel time required for the first route defined from the present position up to the destination place, which contains the traffic jam or restriction region and is searched at the step 303 (step 1004). After the process operation defined at this step 1004, the display control means 903 judges as to whether or not the travel time required for the second route (step 1003) is shorter than that for the first route by comparing the calculated travel time at the step 1003 with that of the step 1004 (step 1005).

When the display control means 903 judges at the step 1005 that the travel time required for the second route is shorter than that for the first route, the second route containing the route of the step 1001 up to the destination place is displayed on the display unit 14 (step 1006), and then the process operation is returned to the step 301.

In such a judgment case that the traffic jam or restriction region is not present at the step 305, the detour route is not detected at the step 1002, or the second route travel time is not shorter than the first route travel time at the step 1005, the first route searched at the step 303 is displayed on the display unit 14 (step 1007), and then the process operation is returned to the step 301.

Since the mobile navigation system is arranged by employing the above-described arrangement, when the traffic jam or restriction region is present in the searched route, it is possible to judge as to along which route, the moving objects can travel in shorter time based upon the travel time required for the first route containing the traffic jam or restriction region, and the travel time required for the second route containing neither traffic jam nor restriction region. As a consequence, the mobile navigation system can be operated with high utilization.

Sixth Embodiment

Figure 12:
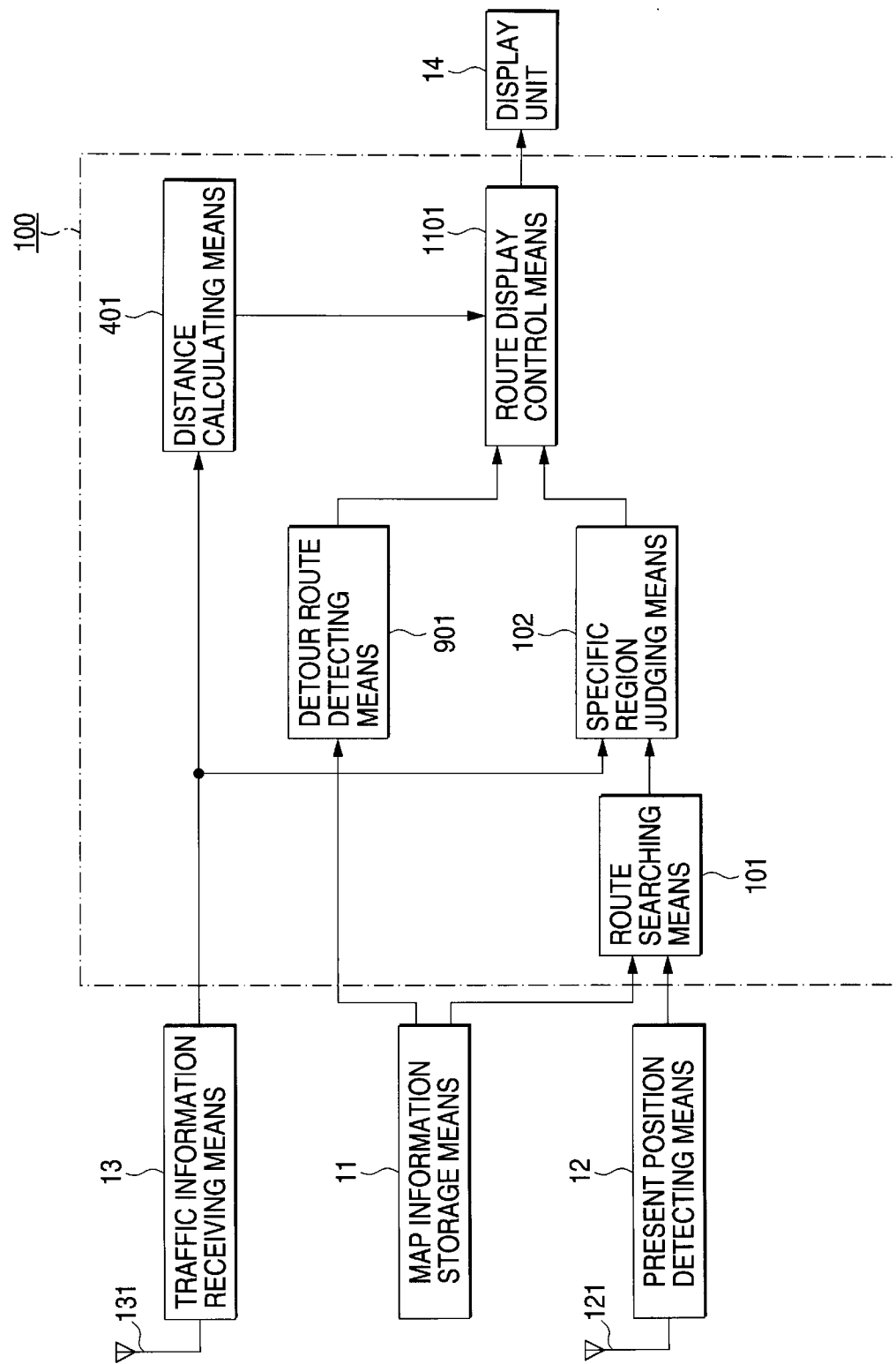
FIG. 12 is a schematic block diagram for indicating an overall arrangement of a mobile navigation system according to a sixth embodiment of the present invention.
Figure 13:
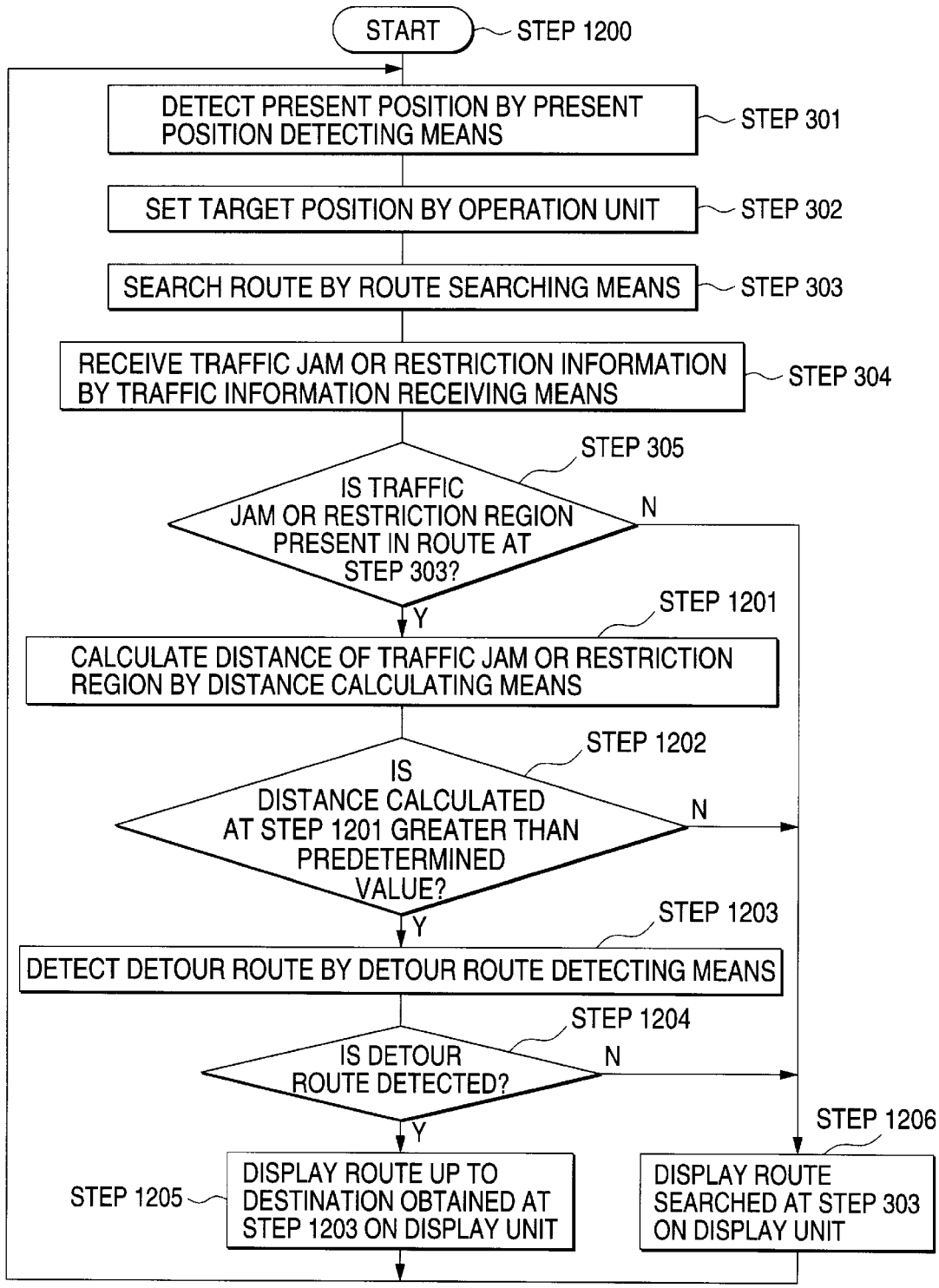
FIG. 13 is a flow chart for describing operations of the mobile navigation system shown in FIG. 12.

FIG. 12 is a schematic block diagram for showing an arrangement of a mobile navigation system which displays one of a searched route and another route containing neither a traffic jam region nor a traffic restriction region, depending upon a distance of either the traffic jam region or the traffic restriction region contained in this searched route, according to a sixth preferred embodiment of the present invention. FIG. 13 is a flow chart for representing operations of the mobile navigation system shown in FIG. 12. It should be noted that the same reference numerals of the above-described embodiments 1 to 4 will be employed as those for denoting the same or similar units in the sixth embodiment of FIG. 12.

In FIG. 12, reference numeral 1101 denotes a route display control means for causing the display unit 14 to display one of a first route and a second route based upon a relationship among the output from the specific region judging means 102, the output from the distance calculating means 401, and the output from the detour route detecting means 901. The first route is defined from the present position up to a destination place, in that either the traffic jam region or the traffic restriction region is contained. The second route is defined from the present position up to a destination place, in that the detour route out of traffic jam region or traffic restriction region is contained.

Referring now to the flow chart of FIG. 13, operations of the mobile navigation system shown in FIG. 12 will be explained.

First, the route searching operation is initiated (step 1200), and then the process operation is advanced to a step 301. Since the process operations defined from the step 301 to the step 305 are similar to those of FIG. 4, explanations thereof are omitted.

When it is judged at the step 305 that either the traffic jam region or the traffic restriction region is present in the searched route, the process operation is advanced to a step 1201. At this step 1201, the distance calculating means 401 calculates a distance of either the traffic jam region or the traffic restriction region (step 1201).

After the process operation defined at the step 1201, the route display control means 1101 judges as to whether or not the distance calculated at the step 1201 is longer than, or equal to a predetermined value (for example, 1 km) at a step 1202. When the route display control means 1101 judges that this calculated distance is longer than, or equal to the predetermined value, the process operation is advanced to a step 1203. At this step 1203, the detour route detecting means 901 detects the detour route.

After the process operation defined at the step 1203, the route display control means 1101 judges as to whether or not the detour route has been detected at the step 1203 (step 1204). In such a case that the route display control means 1101 judges that the detour route has been detected at the step 1204, the route which has been detected at the step 1203 and does not contain the traffic jam or restriction region is displayed on the display unit 14 (step 1205), and then the process operation is returned to the step 301.

Conversely, when it is judged at the step 305 that neither the traffic jam region nor the traffic restriction region is present, when it is judged at the step 1202 that the calculated distance is smaller than a predetermined value, and when it is judged at the step 1204 that no detour route is detected, the route which has been searched at the step 303 and contains either the traffic jam region or the traffic restriction region is displayed on the display unit 14 (step 1206), and the process operation is returned to the step 301.

Accordingly, in the mobile navigation system with the above-described arrangement, when either the traffic jam or restriction region is present in the searched route and the route is present out of this region, and when the distance of the traffic jam or restriction region is long, the detour route is selected. Conversely, when the distance of the traffic jam or restriction region is short, the above-described route containing the traffic jam or restriction region is selected. Therefore, the time required to calculate the travel time is no longer required, and the process time can be shortened.

Seventh Embodiment

Figure 14:
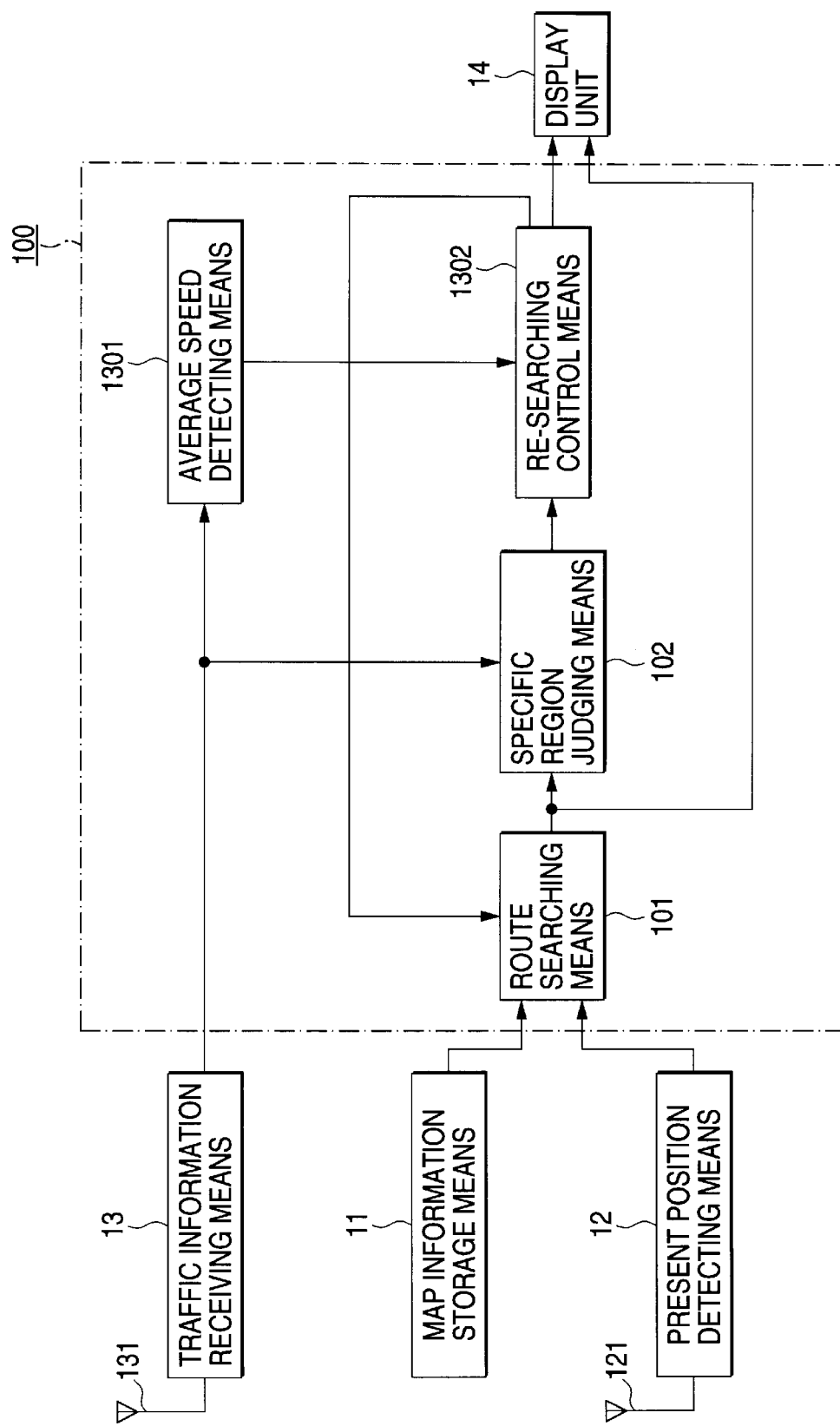
FIG. 14 is a schematic block diagram for indicating an overall arrangement of a mobile navigation system according to a seventh embodiment of the present invention.
Figure 15:
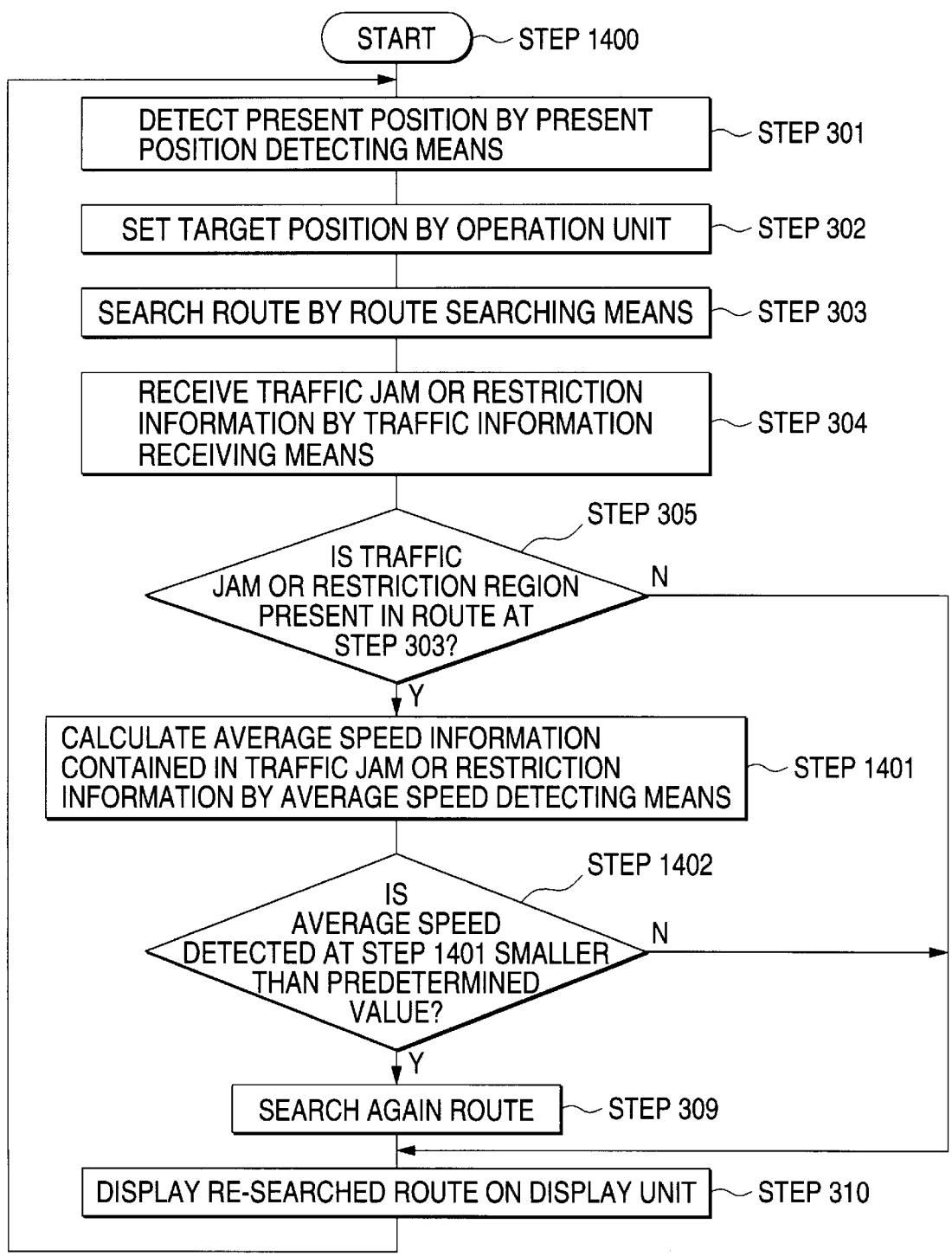
FIG. 15 is a flow chart for describing operations of the mobile navigation system shown in FIG. 14.

FIG. 14 is a schematic block diagram for showing an arrangement of a mobile navigation system with employment of an average speed calculating means, according to a seventh embodiment of the present invention. FIG. 15 is a flow chart for representing operations of the navigation system shown in FIG. 14. It should be noted that the same reference numerals of the above-described embodiment 1 to 4 will be employed as those for denoting the same or similar units in the seventh embodiment of FIG. 14.

In FIG. 14, reference numeral 1301 indicates an average speed detecting means for detecting an average speed of a moving object located near a traffic jam region or a traffic restriction region based on the traffic jam information or the traffic restriction information received by the traffic information receiving means 13. Also, reference numeral 1302 denotes a re-searching control means for causing the route searching means 101 to re-search the route in response to the output from the average speed detecting means 1301 when the specific region judging means 102 judges that either the traffic jam region or the traffic restriction region is present.

Referring now to the flow chart of FIG. 15, operations of the mobile navigation system shown in FIG. 14 will be explained.

First, the route searching operation is initiated (step 1400), and then the process operation is advanced to a step 301. Since the process operations defined from the step 301 to the step 305 are similar to those of FIG. 4, explanations thereof are omitted.

When it is judged at the step 305 that either the traffic jam region or the traffic restriction region is present in the route, the process operation is advanced to a step 1401. At this step 1401, the average speed detecting means 1301 detects average speed information contained in the traffic jam information, or the traffic restriction information (step 1401).

After the process operation defined at the step 1401, the re-searching control means 1302 judges as to whether or not the value of the average speed detected at this step 1401 is smaller than, or equal to a predetermined value (step 1402). When the re-searching control means 1302 judges at this step 1402 that the value of the average speed is smaller than, or equal to a predetermined value, the route is again searched (step 309) and then this searched route is displayed on the display unit 14 (step 310). Therefore, the process operation is returned to the step 301.

To the contrary, when it is judged at the step 305 that neither the traffic jam region nor the traffic restriction region is present, and also when it is judged at the step 1402 that the value of the average speed is larger than, or equal to a preselected value, the process operation is advanced to a step 310. At this step 310, the route is displayed on the display unit 14, and then the process operation is returned to the step 301.

As a consequence, since the mobile navigation system is arranged with employment of the above-described arrangement, a selection can be made of either the route involving the traffic jam or restriction region, or the route not involving the traffic jam or restriction region based on the average speed near the traffic jam region or the traffic restriction region. The calculation about the travel time of the moving object is no longer required. Therefore, the process time can be reduced.

In the above-described process operation, when it is judged at the step 1402 that the average speed is lower than, or equal to a predetermined value, the process operation is advanced to the step 309 so as to re-search the route. Alternatively, the process operation may be returned to the step 301 at which a series of process operations may be again carried out.

Eighth Embodiment

Figure 16:
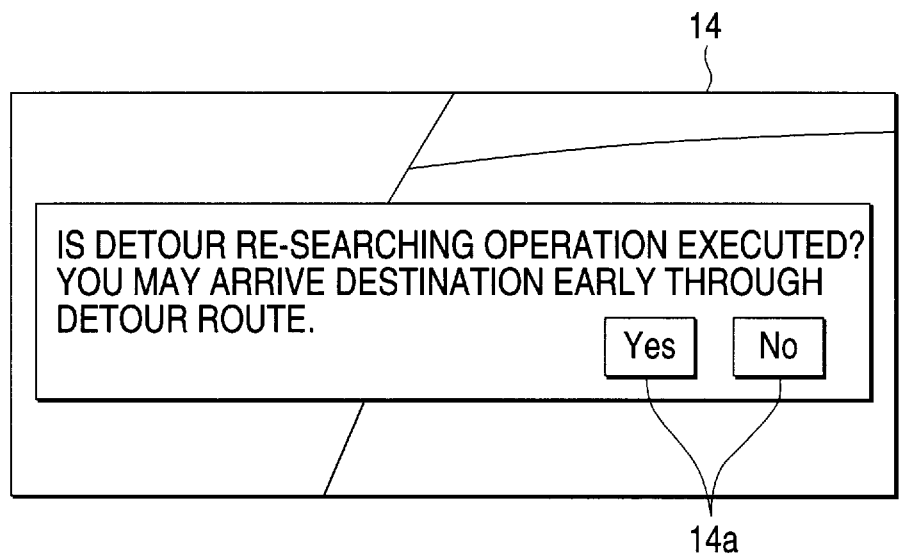
FIG. 16 is a display condition diagram for showing a display condition of a display unit employed in a mobile navigation system according to an eighth embodiment of the present invention.

In the above-explained embodiments 1 to 3 and 7, a touch-panel type Yes/No operation unit 14a is provided. As represented in FIG. 16, such an indication "Is detour re-searching operation executed?, you may arrive destination place early through detour route" is displayed on the display unit 14. This touch-panel type Yes/No operation unit 14a is provided on the display screen of the display unit 14 so as to set as to whether or not the re-searching control means executes the re-searching control operation. Moreover, this re-searching control means may be manually operated to select "Yes" and "No". That is, when "Yes" is manipulated, the route is again searched, whereas when "No" is manipulated, the route is not again searched. With employment of this arrangement, since the operator can select whether or not the route is re-searched, the free degree of the search selection can be improved.

Ninth Embodiment

Figure 17:
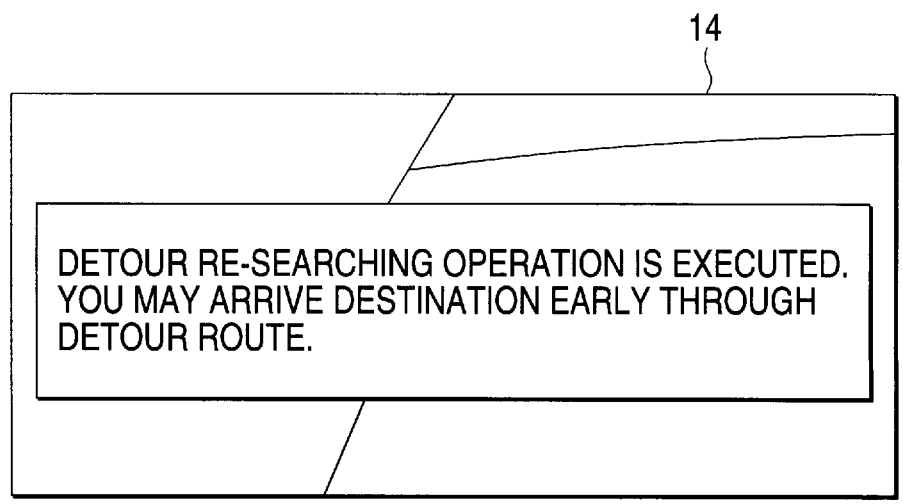
FIG. 17 is a display condition diagram for indicating a display condition of a display unit employed in a mobile navigation system according to a ninth embodiment of the present invention.

In the above-described embodiment 8, the route re-searching control by the re-searching control means is carried out by the Yes/No operation unit 14a, namely manually selecting either the "Yes" touch panel or the "No" touch panel. Alternatively, such a re-searching control may be automatically performed without any manual selection in accordance only with the judgment as to whether or not the route is re-searched by the re-searching control means, as represented in FIG. 17 "detour re-searching operation is executed. You may arrive early destination place through detour route. As a result, the cumbersome operation can be avoided, and thus the utilization of the mobile navigation system can be improved.

Tenth Embodiment

Figure 18:
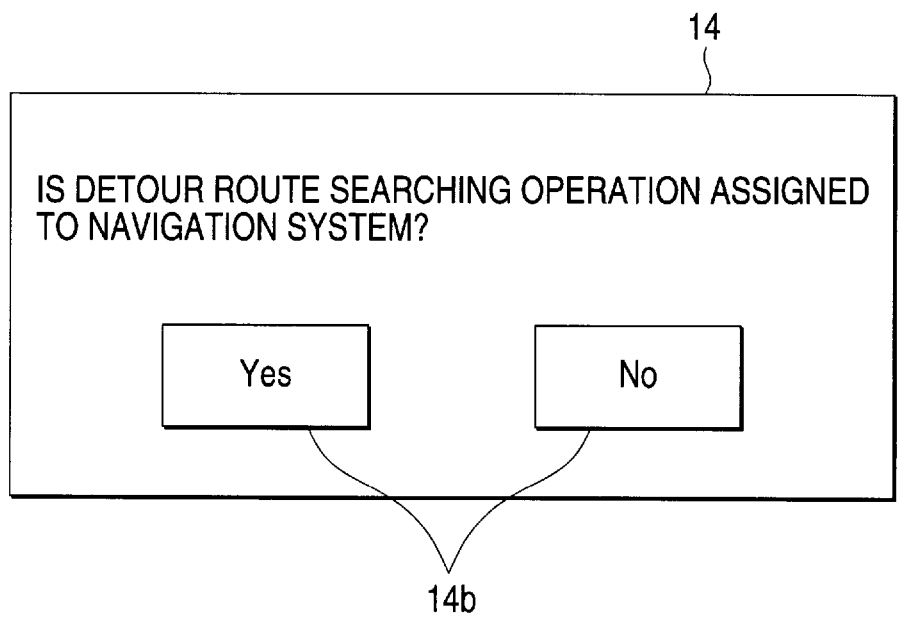
FIG. 18 is a display condition diagram for showing a display condition of a display unit employed in a mobile navigation system according to a tenth embodiment of the present invention.

When the route is re-searched by the route searching means 101 in the above-described embodiments 1 to 7, such an indication as shown in FIG. 18 is made on the display unit 14, and a control switching means may be provided. That is, as illustrated in the touch-panel type operation unit 14a of FIG. 18, the re-searching control means performs the route re-searching operation in response to the touch-panel operation. Otherwise, the route re-searching operation is automatically executed.

As a result, since the tenth is constructed by employing the above-described arrangement, the free degree of the operation can be improved and the utilization of the mobile navigation system can be improved.

Eleventh Embodiment

A warning buzzer and/or a warning lamp may be provided with the above-explained embodiments 1 to 3 and embodiment s 7 to 10. These warning buzzer and lamp correspond to announcing means for producing a predetermined announce in response to the route re-searching operation of the re-searching control means. With employment of such an announcing means, such a fact as to whether or not the route is re-searched can be firmly announced to the operator.

Twelfth Embodiment

Figure 19:
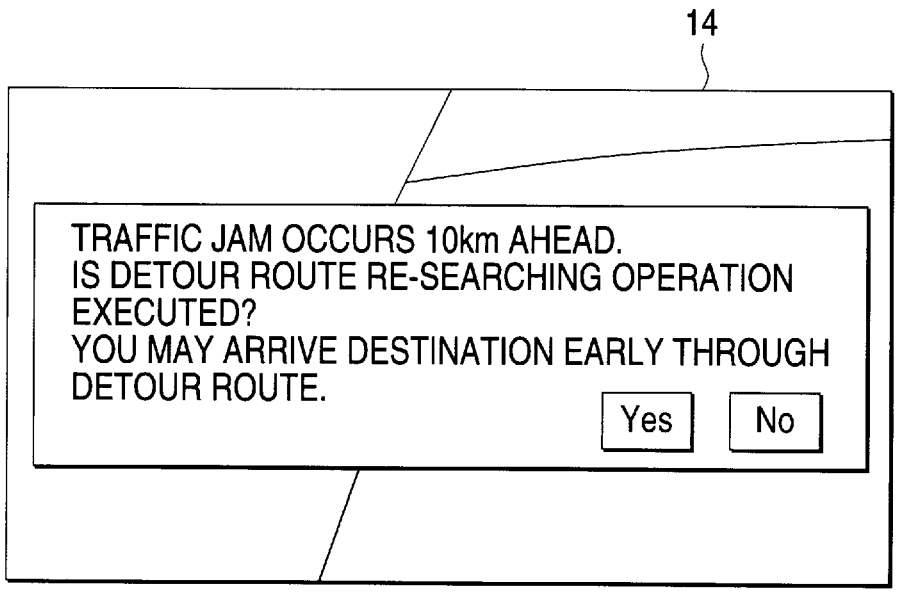
FIG. 19 is a display condition diagram for indicating a display condition of a display unit employed in a mobile navigation system according to a twelfth embodiment of the present invention.

In the case that the re-searching control means judges that the route is again searched by the route searching means 101 in the embodiments 1 to 3 and embodiments 7 to 11, the traffic jam information or the traffic restriction information received by the traffic information receiving means may be displayed on the display unit 14 as shown in FIG. 19. As a consequence, the operator can understand why the route is re-searched, and thus the utilization of this mobile navigation system can be improved.

Thirteenth Embodiment

In the above-described embodiment 5, the route display control means judges the route to be displayed based upon the relationship between the travel time required for the respective routes and calculated by the travel time calculating means. Alternatively, the route required for the shorter travel time may be preferably displayed on the display unit 14.

While the mobile navigation system according to the present invention has been arranged with employment of the above-described arrangements, there are the below-mentioned advantages.

That is, since the mobile navigation system is constructed of the arrival time calculating means for calculating time required such that the moving object reaches the traffic jam or restriction region; the decreasing time detecting means for detecting time during which the traffic jam or restriction region is decreased based upon the traffic jam or restriction information received by the traffic information receiving means; and the re-searching control means for causing the route searching means to re-search the route in accordance with a relationship between the output from the decreasing time detecting means and the output from the arrival time calculating means when the specific region judging means judges that the traffic jam or restriction region is present, a correct judgment can be made as to whether or not the route is re-searched based upon the relationship between the arrival time and the decreasing time. As a consequence, the travel time of the moving object can be shortened as much as possible.

Also, the mobile navigation system is arranged by the distance calculating means for calculating a distance of the traffic jam region or the traffic restriction region involved in the route searched by the route searching means based upon the route searched by the route searching means and the traffic jam or restriction information received by the traffic information receiving means; and the re-searching control means for causing the route searching means to re-search the route in accordance with the output from the distance calculating means when the specific region judging means judges that the traffic jam or restriction region is present. It is possible to judge as to whether or not the route is re-searched based on the distance of either the traffic jam region or the traffic restriction region. Accordingly, the travel time of the moving object can be reduced as much as possible.

Further, the mobile navigation system is constructed of the decreasing rate calculating means for calculating a rate when the traffic jam or restriction region is decreased based upon the traffic jam or restriction information received by the traffic information receiving means; and re-searching control means for causing the route searching means to re-search the route in accordance with the output from the decreasing rate calculating means when the specific region judging means judges that the traffic jam or restriction region is present. It is possible to correctly judge as to whether or not the route is re-searched based only on the decreasing rate of the traffic jam, or restriction region even when there is no information about the decreasing time of the traffic jam region, or restriction region.

Also, the mobile navigation system is constituted by the average speed detecting means for detecting an average speed of the moving object located near the traffic jam or restriction region based on the traffic jam or restriction information received by the traffic information receiving means; and the re-searching control means for causing the route searching means to re-search the route in accordance with the output from the average speed detecting means when the specific region judging means judges that the traffic jam or restriction region is present. It is possible to correctly judge as to whether or not the route is re-searched based only on the average speed of the moving object located near the traffic jam or restriction region even when there is no information about the decreasing time of the traffic jam or restriction region.

Since the re-searching control means causes the route searching means to re-search the route when the decreasing time detected by the decreasing time detecting means is longer than the arrival time calculated by the arrival time calculating means, only when the distance of the traffic jam or restriction region is not reduced before the moving object reaches the traffic jam or restriction region, the route can be re-searched by the route re-searching means. Therefore, the travel time of the moving object can be reduced as much as possible.

Since the re-searching control means automatically re-searches the route, when the re-searching control means judges to cause the route searching means to re-search the route, the route re-searching operation can be automatically performed without manipulating the operation unit. As a result, the cumbersome operation of the operation unit can be reduced.

Since the re-searching control means re-searches the route in response to the operation of the operation unit, the route can be re-searched in accordance with the operator's will, so that the utilization of the navigation system can be improved.

The navigation system further comprises control switching means for switching whether the re-searching control means causes the route searching means to re-search the route in response to the manipulation of the operation unit, or to automatically re-search the route. A selection is made between the manipulation by the operator and the automatic route re-searching operation by the route searching means in accordance with the operator's will. Accordingly, the utilization of the navigation system can be improved.

Since the navigation system further comprises announcing means for producing a predetermined announce in response to the route re-searching operation by the re-searching control means, the route re-searching operation by the re-searching control means can be announced to the operator. Accordingly, discrimination as to whether or not the traffic jam or restriction region is present can be improved.

Furthermore, the mobile navigation system includes the travel time calculating means for calculating travel time required for a first route defined from a present position up to a destination place in that the traffic jam or restriction region is contained, and also for calculating travel time required for a second route defined from a present position up to a destination place in that the route detected by the detour route detecting means is contained, based upon a relationship among the output from the specific region judging means, and the route display control means for controlling a display unit to display thereon any one of the first route and the second route based on a relationship between the travel time of the first route and the travel time of the second route, calculated by the travel time calculating means. Any one of the two routes can be displayed based on a relationship between the travel time required for the route containing the traffic jam or restriction region and the travel time required for the route containing neither the traffic jam nor the restriction region. As a consequence, it is possible to correctly display such a route that the travel time becomes short.

Moreover, the mobile navigation system is constructed of the route display control means for controlling a display unit to display thereon one of a first route defined by a present position containing the traffic jam or traffic restriction region up to a destination place, and also a second route defined by a present position containing the route out of traffic jam region or traffic restriction region based upon a relationship among the output from the specific place judging means, the output from the distance calculating means, and the output from the detour route detecting means.

The route containing neither the traffic jam nor restriction region is detected based on the distance of the traffic jam or restriction region. Any one of the two routes, namely one route containing the traffic jam or restriction region, and the other route containing neither the traffic jam nor restriction region can be displayed in accordance with this detection result. Accordingly, it is possible to correctly display such a route that the travel time becomes short.

Since the route display control means causes the display unit to display thereon the route required for the short travel time calculated by the travel time calculating means, the route required for the short travel time can be displayed. As a consequence, the travel time of the moving object can be reduced as much as possible.

What is claimed is:

1. A mobile navigation system comprising:

present position detecting means for detecting a present position of a moving object;

map information storage means for storing map information;

route searching means for searching a route defined from said present position of said moving object detected by said present position detecting means up to a destination place from said map information of said map information storage means;

traffic information receiving means for receiving traffic jam information or traffic restriction information;

specific region judging means for judging whether or not a traffic jam or restriction region is present within said route searched by said route searching means;

degree detection means for detecting a degree of said traffic jam or restriction based upon said traffic jam or restriction information received by said traffic information receiving means;

re-searching control means for causing said route searching means to search again a route in accordance with a detection result of said degree detection means;

arrival time calculating means for calculating time required such that said moving object reaches said traffic jam or restriction region; and decreasing time detecting means for detecting time during which said traffic jam or restriction region is decreased based upon said traffic jam or restriction information received by said traffic information receiving means; and wherein said re-searching control means causes said route researching means to search again a route in accordance with a relationship between the output from said decreasing time detecting means and the output from said arrival time calculating means when said specific region judging means judges that the traffic jam or restriction region is present.

2. A mobile navigation system as claimed in claim 1, wherein said re-searching control means causes said route searching means to re-search the route when the decreasing time detected by said decreasing time detecting means is longer than the arrival time calculated by said arrival time calculating means.

3. A mobile navigation system as claimed in claim 1 further comprising:
an operation unit for setting whether or not said re-searching control means executes the re-searching control by manipulating said operation unit; and
wherein said re-searching control means causes the route searching means to re-search the route in response to the manipulation of said operation unit.

4. A mobile navigation system as claimed in claim 1, wherein said re-searching control operation automatically causes the route searching means to re-search the route.

5. A mobile navigation system as claimed in claim 1 further comprising:
control switching means for switching whether said re-searching control means causes the route searching means to re-search the route in response to the manipulation of the operation unit, or to automatically re-search the route.

6. A mobile navigation system as claimed in claim 1 further comprising announcing means for producing a predetermined announce in response to the route re-searching operation by said re-searching control means.

7. A mobile navigation system comprising:
present position detecting means for detecting a present position of a moving object;
map information storage means for storing map information;
route searching means for searching a route defined from said present position of said moving object detected by said present position detecting means up to a destination place from said map information of said map information storage means;
traffic information receiving means for receiving traffic jam information or traffic restriction information;
specific region judging means for judging whether or not a traffic jam or restriction region is present within said route searched by said route searching means;
degree detection means for detecting a degree of said traffic jam or restriction based upon said traffic jam or restriction information received by said traffic information receiving means;
re-searching control means for causing said route searching means to search again a route in accordance with a detection result of said degree detection means; and
decreasing rate calculating means for calculating a rate of decreasing the traffic jam or restriction region based upon the traffic jam or restriction information received by said traffic information receiving means;
wherein said re-searching control means causes said route searching means to re-search the route in accordance with the output from said decreasing rate calculating means when said specific region judging means judges that the traffic jam or restriction region is present.

8. A mobile navigation system as claimed in claim 7, wherein said re-searching control means causes said route searching means to re-search the route when the decrease rate output from said decreasing rate calculating means lower than a predetermined value.

9. A mobile navigation system comprising:
present position detecting means for detecting a present position of a moving object;
map information storage means for storing map information;
route searching means for searching a route defined from the present position of the moving object detected by said present position detecting means up to a destination place from the map information of said map information storage means;
traffic information receiving means for receiving traffic jam information or traffic restriction information;
specific region judging means for judging as to whether or not a traffic jam or restriction region is present within the route searched by said route searching means;
degree detection means for detecting a degree of said traffic jam or restriction based upon said traffic jam or restriction information received by said traffic information receiving means; and
detour route detecting means for detecting a detour route which contains neither a traffic jam region nor a traffic restriction region from the map information of said map information storage means in accordance with the judgement of said specific region judging means;
travel time calculating means for calculating travel time required for the route searched by said route searching means in that a traffic jam or restriction region is contained, and also for calculating travel time required for the detour route detected by said detour route detecting means in that no traffic jam or restriction region is contained, based upon a relationship among the output from said specific region judging means, the output from said degree detecting means, and the output from said detour route detecting means; and
route display control means for controlling a display unit to display thereon one of said route searched by said route searching means and said detour route based on a relationship between the travel time of said route and the travel time of said detour route, calculated by said travel time calculating means;
arrival time calculating means for calculating time required such that said moving object reaches the traffic jam or restriction region;
decreasing time detecting means for detecting time during which said traffic jam or restriction region is decreased based upon the traffic jam or restriction information received by said traffic information receiving means; and
wherein said travel time calculating means calculates travel times based upon a relationship among the output from said specific region judging means, the output from said arrival time calculation means, the output from said decrease time detecting means, and the output from said detour route detecting means.

10. A mobile navigation system as claimed in claim 9 wherein:
said route display control means causes the display unit to display thereon the route required for the short travel time calculated by said travel time calculating means.

* * * * *